United States Patent
Huang et al.

(10) Patent No.: US 7,024,160 B2
(45) Date of Patent: Apr. 4, 2006

(54) WIRELESS TRANSCEIVER WITH ENHANCED PROTECTION AGAINST INTERFERENCE

(75) Inventors: Shzh-Hong Huang, Taipei (TW); Wei-Luen Shen, Taipei (TW); Ching-Ming Chen, Taipei (TW); Yu-Pin Lin, Taipei (TW)

(73) Assignee: Compal Electronics, Inc, Taipei (TW)

( * ) Notice: Subject to any disclaimer, the term of this patent is extended or adjusted under 35 U.S.C. 154(b) by 405 days.

(21) Appl. No.: 10/635,493

(22) Filed: Aug. 7, 2003

(65) Prior Publication Data

US 2005/0032498 A1    Feb. 10, 2005

(51) Int. Cl.
*H04B 1/18* (2006.01)

(52) U.S. Cl. ............ 455/41.1; 455/300; 455/226.1; 455/41.3; 455/296

(58) Field of Classification Search ........... 455/41.1, 455/41.2, 41.3, 296, 300, 301, 117, 129, 106, 455/107, 226.1, 226.2, 67.11; 343/867
See application file for complete search history.

(56) References Cited

U.S. PATENT DOCUMENTS

| | | | | |
|---|---|---|---|---|
| 6,134,420 A | * | 10/2000 | Flowerdew et al. | 455/300 |
| 6,367,266 B1 | * | 4/2002 | Kobayashi et al. | 455/226.1 |
| 6,424,820 B1 | * | 7/2002 | Burdick et al. | 455/41.1 |
| 2002/0065044 A1 | * | 5/2002 | Ito | 455/41.1 |
| 2004/0224638 A1 | * | 11/2004 | Fadell et al. | 455/41.2 |

* cited by examiner

*Primary Examiner*—Lana Le
(74) *Attorney, Agent, or Firm*—Bacon & Thomas, PLLC

(57) ABSTRACT

A wireless transceiver includes a circuit board, a Bluetooth module, an antenna unit and an electrical connector. The circuit board has a component mounting side to be disposed so as to confront the electronic device. The Bluetooth module and the antenna unit are mounted on the component mounting side and are connected electrically to the circuit board. The electrical connector is mounted on the circuit board and is adapted to connect electrically the wireless transceiver to the electronic device. The antenna unit has a radiating direction that is directed toward the electronic device, is adapted to cooperate with the electronic device to form a shielding space, and is adapted to form a virtual transmission source internally of the electronic device. The shielding space and the virtual transmission source cooperate to protect the wireless transceiver from interference.

4 Claims, 1 Drawing Sheet

WIRELESS TRANSCEIVER WITH ENHANCED PROTECTION AGAINST INTERFERENCE

BACKGROUND OF THE INVENTION

1. Field of the Invention

The invention relates to a wireless transceiver for an electronic device, more particularly to a wireless transceiver configured with a shielding space and a virtual transmission source that cooperate to protect the wireless transceiver from interference.

2. Description of the Related Art

Nowadays, in view of lower costs and prevalence of wireless communication, wireless communication devices, such as infrared transmission devices, wireless communication network devices, Bluetooth communication devices, etc., have become essential components of an electronic device. Moreover, for added functionality, it is not uncommon for more than two types of wireless communication devices to coexist in the same electronic device. In view of the trend toward miniaturization of electronic devices, distances among different wireless communication devices on the same electronic device tend to become smaller, which can result in severe mutual interference.

As shown in FIG. 1, a conventional Bluetooth communication device 100 is mounted on an electronic device 90 that includes a metal shell 91 and another wireless transceiver 93 of a different type. The Bluetooth communication device 100 includes a circuit board 11, a Bluetooth module 12, an electrical connector 13, and an antenna unit 14. The circuit board 11 is mounted on the metal shell 91. The Bluetooth module 12 and the antenna unit 14 are mounted on a component mounting surface of the circuit board 11, and are connected electrically to the circuit board 11. The electrical connector 13 is mounted on the circuit board 11, and is adapted to connect electrically the Bluetooth communication device 100 to the electronic device 90.

It is noted that the antenna unit 14 and the wireless transceiver 93 radiate signals in a direction away from the electronic device 90. Therefore, the Bluetooth communication device 100 and the wireless transceiver 93 must have a sufficient spacing therebetween so as to minimize mutual interference of signals that can affect normal operation of the same.

SUMMARY OF THE INVENTION

Therefore, the object of the present invention is to provide a wireless transceiver adapted for use with an electronic device and configured with a shielding space and a virtual transmission source that cooperate to protect the wireless transceiver from interference.

Accordingly, a wireless transceiver of this invention is adapted for use with an electronic device, and comprises a circuit board, a Bluetooth module, an antenna unit, and an electrical connector. The circuit board has a component mounting side to be disposed so as to confront the electronic device. The Bluetooth module and the antenna unit are mounted on the component mounting side and are connected electrically to the circuit board. The electrical connector is mounted on the circuit board and is adapted to connect electrically the wireless transceiver to the electronic device. The antenna unit has a radiating direction that is directed toward the electronic device, is adapted to cooperate with the electronic device to form a shielding space, and is adapted to form a virtual transmission source internally of the electronic device. The shielding space and the virtual transmission source cooperate to protect the wireless transceiver from interference.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
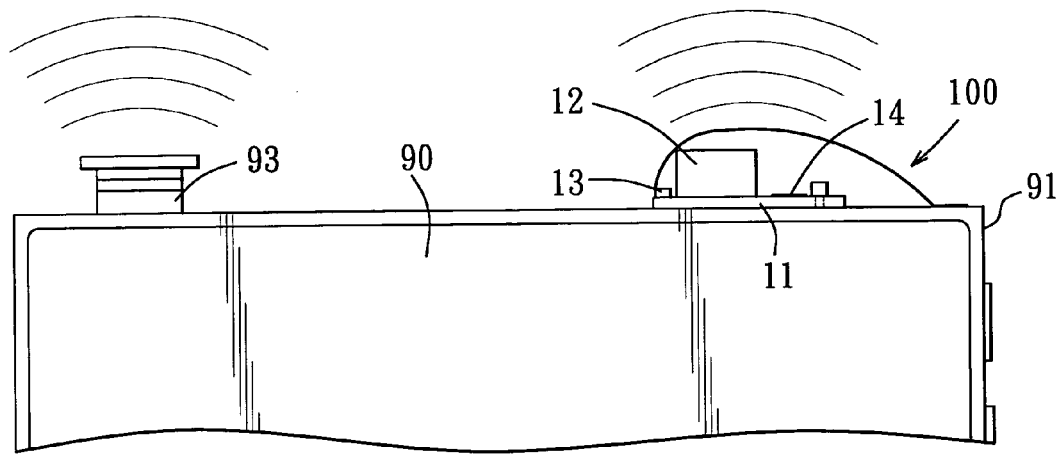
FIG. 1 is a fragmentary schematic view of an electronic device that incorporates a conventional Bluetooth communication device.
Figure 2:
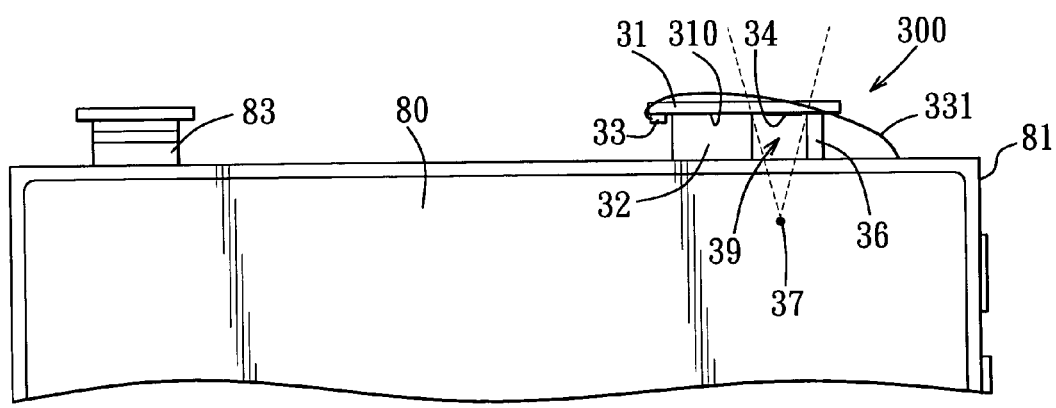
FIG. 2 is a fragmentary schematic view of an electronic device that incorporates the preferred embodiment of a wireless transceiver according to the present invention.

Referring to FIG. 2, the preferred embodiment of a wireless transceiver 300, which is a Bluetooth communication device in this embodiment, according to the present invention is shown to be adapted for use with an electronic device 80 that has a metal shall 81 mounted with another wireless transceiver 83 of a different specification. The wireless transceiver 300 comprises a circuit board 31, a Bluetooth module 32, an antenna unit 34, and an electrical connector 33.

The circuit board 31 has a component mounting side 310 to be disposed so as to confront the metal shell 81 of the electronic device 80.

The Bluetooth module 32, the electrical connector 33, and the antenna unit 34 are mounted on the component mounting side 310 and are connected electrically to the circuit board 31. In this embodiment, the Bluetooth module 32 is disposed between the electrical connector 33 and the antenna unit 34.

The electrical connector 33 is adapted to connect electrically the wireless transceiver 300 to the electronic device 80. In this embodiment, the electrical connector 33 is a Universal Serial Bus (USB) connector that permits connection to the electronic device 80 through a USB cable 331.

During assembly, the Bluetooth module 32 has a distal side opposite to the component mounting side 310 of the circuit board 31 and disposed to abut against the metal shell 81 of the electronic device 80. The antenna unit 34 thus faces toward the metal shell 81. The antenna unit 34 further has one end distal from the Bluetooth module 32 and formed with an antenna element 36 that extends in a direction transverse to the component mounting side 310 of the circuit board 31 and that is adapted to be mounted on the metal shell 81, thereby securing the wireless transceiver 300 on the electronic device 80. In this embodiment, the antenna element 36 is made of copper alloy and serves to anchor firmly the wireless transceiver 300 on the metal shell 81.

In the present invention, the antenna unit 34 has a radiating direction that is directed toward the electronic device 80. In addition, the antenna unit 34 is adapted to cooperate with the circuit board 31, the Bluetooth module 32 and the metal shell 81 of the electronic device 80 to form a shielding space 39. Moreover, by virtue of mirror principles, the antenna unit 34 is adapted to form a virtual transmission source 37 internally of the metal shell 81 of the electronic device 80. The shielding space 39 and the virtual transmission source 37 cooperate to focus signals transmitted and received by the wireless transceiver 300, and protect the wireless transceiver 300 of this invention from interference attributed to the other wireless transceiver 83 on the metal shell 81. In this manner, a shorter distance between the wireless transceivers 300, 83 is possible without resulting in mutual interference, and the size of the electronic device 80 can be further reduced accordingly.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A wireless transceiver adapted for use with an electronic device, comprising:

a circuit board having a component mounting side to be disposed so as to confront the electronic device;

a Bluetooth module mounted on said component mounting side and connected electrically to said circuit board;

an antenna unit mounted on said component mounting side and connected electrically to said circuit board; and an electrical connector mounted on said circuit board and adapted to connect electrically said wireless transceiver to the electronic device;

wherein said antenna unit has a radiating direction that is directed toward the electronic device, is adapted to cooperate with the electronic device to form a shielding space, and is adapted to form a virtual transmission source internally of the electronic device;

wherein said shielding space and said virtual transmission source cooperate to protect said wireless transceiver from interference.

2. The wireless transceiver as claimed in claim 1, wherein said electrical connector is a Universal Serial Bus connector.

3. The wireless transceiver as claimed in claim 1, wherein said antenna unit has one end distal from said Bluetooth module and formed with an antenna element that extends in a direction transverse to said component mounting side of said circuit board and that is adapted to be mounted on the electronic device.

4. The wireless transceiver as claimed in claim 3, wherein said antenna element is made of copper alloy.

* * * * *